G. C. HUNTER.
BAND SAW.
APPLICATION FILED MAY 14, 1913.

1,084,801.

Patented Jan. 20, 1914.
5 SHEETS—SHEET 1.

G. C. HUNTER.
BAND SAW.
APPLICATION FILED MAY 14, 1913.

1,084,801.

Patented Jan. 20, 1914.
5 SHEETS—SHEET 3.

Witnesses

Inventor
George C. Hunter
By John A. Bommhardt
Attorney

G. C. HUNTER.
BAND SAW.
APPLICATION FILED MAY 14, 1913.

1,084,801.

Patented Jan. 20, 1914.
5 SHEETS—SHEET 4.

G. C. HUNTER.
BAND SAW.
APPLICATION FILED MAY 14, 1913.
1,084,801.
Patented Jan. 20, 1914.
5 SHEETS—SHEET 5.
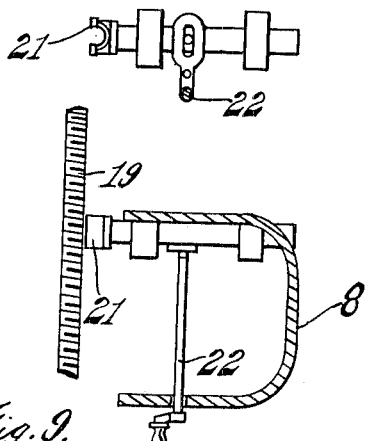
Fig. 9.
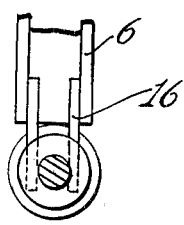
Fig. 7.
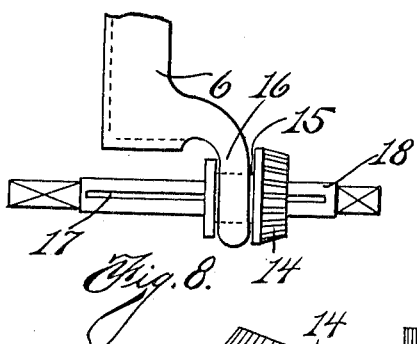
Fig. 8.
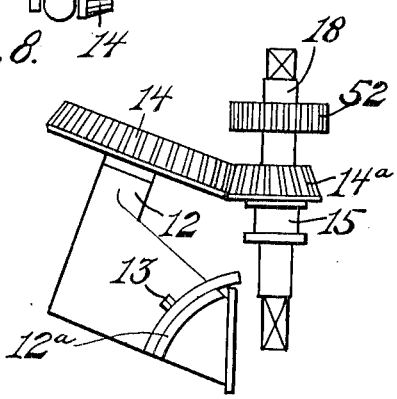
Fig. 6.
Fig. 5.
Witnesses
H. L. Richey
Gertrude M. Skinner
Inventor
George C. Hunter
By John A. Bornhardt
Attorney

UNITED STATES PATENT OFFICE.

GEORGE C. HUNTER, OF CLEVELAND, OHIO, ASSIGNOR TO HOUGHTON AND RICHARDS, OF BOSTON, MASSACHUSETTS, A FIRM.

BAND-SAW.

1,084,801.                Specification of Letters Patent.        Patented Jan. 20, 1914.

Application filed May 14, 1913.   Serial No. 767,704.

*To all whom it may concern:*

Be it known that I, GEORGE C. HUNTER, a citizen of the United States, residing at Cleveland, in the county of Cuyahoga and State of Ohio, have invented certain new and useful Improvements in Band-Saws, of which the following is a specification.

This invention relates to band saws, and especially to band saws used for cutting off metal.

Ordinarily, in sawing with a band saw, the material is fed to the saw. In this machine, the material or work is held on a table and the band saw is advanced to the work, the saw pulleys being mounted on a horizontally movable frame which slides in a straight line in guides mounted on a column beside the table. The pulleys are ordinarily set at an angle to the line of movement, so that the return run of the band saw is spaced or set back from the cutting run, so that the latter will cut through the work before the former reaches the work. However, the band pulleys can be set at various angles as desired. For cutting off long work the angular set is necessary. The travel of the frame which carries the band pulleys is produced by suitable feeding devices, in connection with which an adjustable stop is employed to stop the machine by operating a belt shifter when the desired depth of cut is reached.

Various other improvements will be apparent from the following description and the accompanying drawings.

Figure 1:
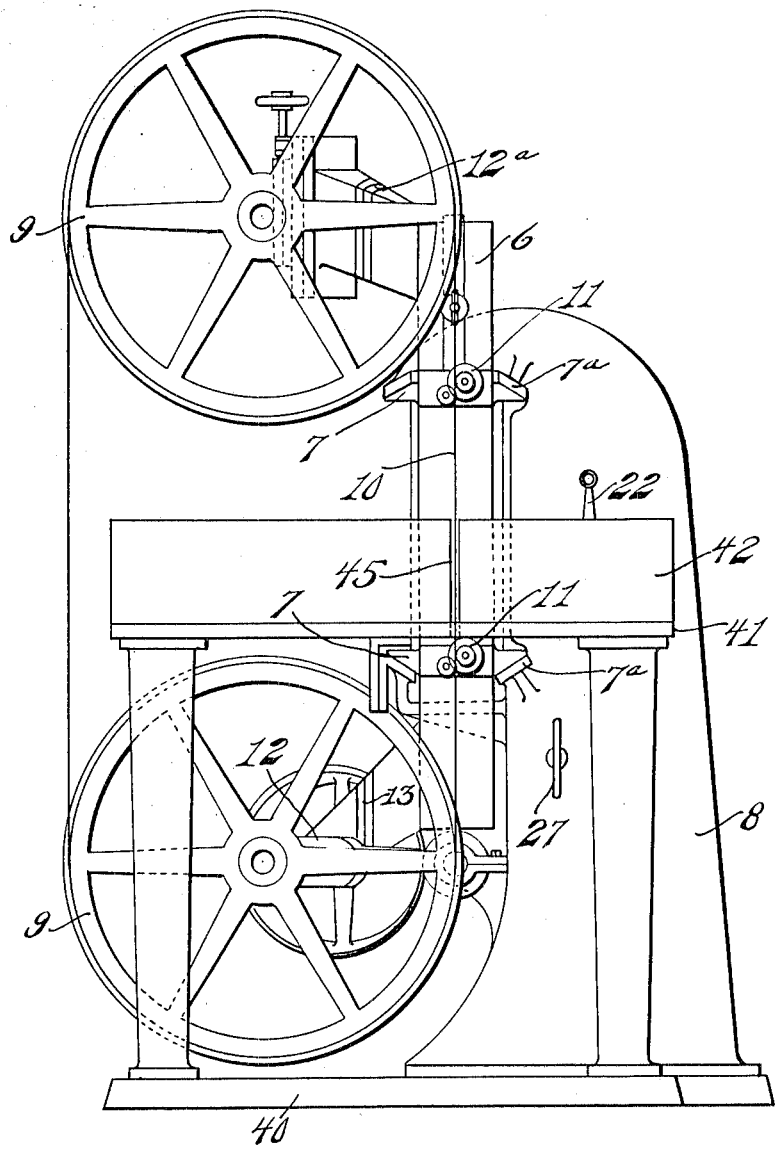
Figure 2:
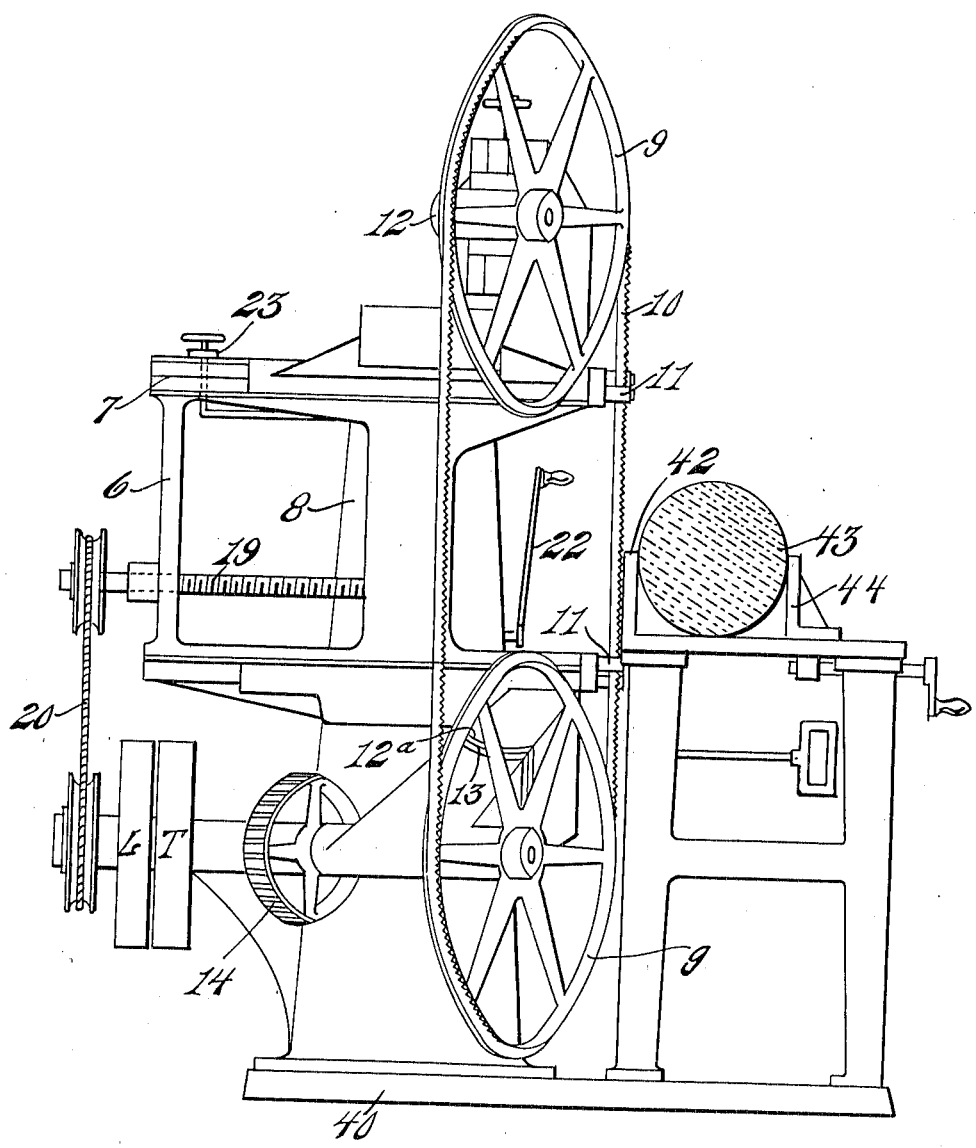
Figure 3:
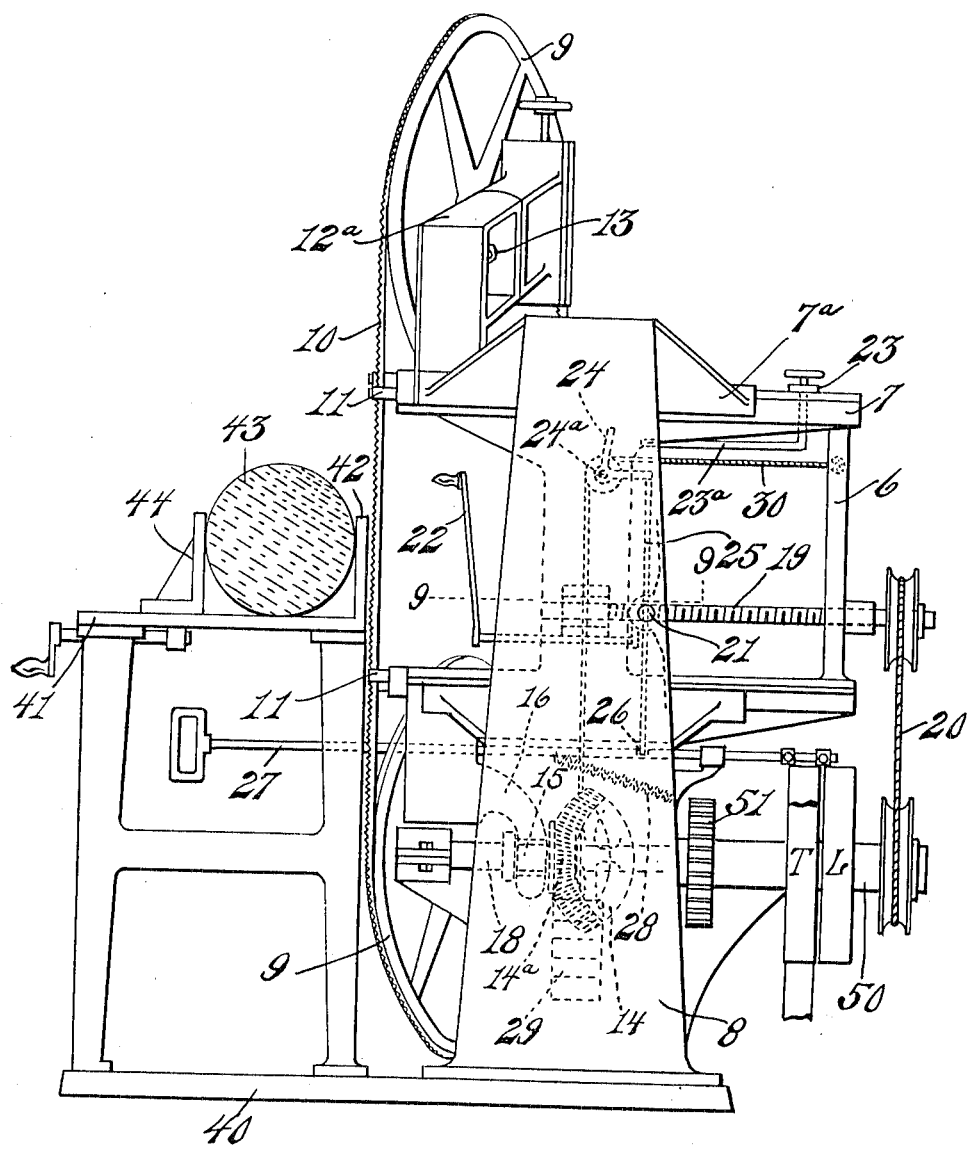
Figure 4:
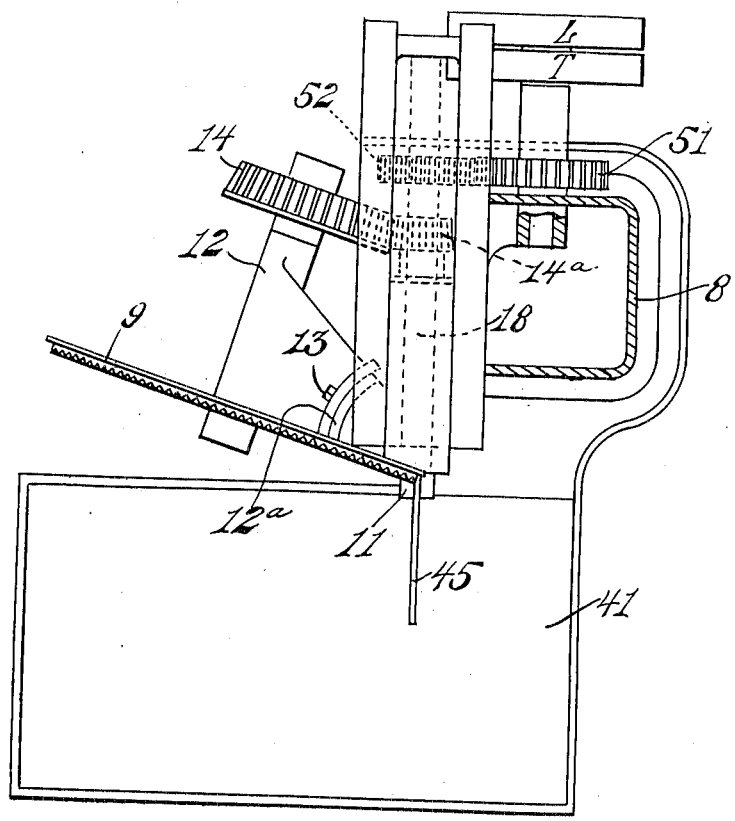

In the drawings—Figure 1 is a front elevation of the machine. Figs. 2 and 3 are opposite side elevations. Fig. 4 is a plan, partly in section. Fig. 5 is a detail of the driving mechanism. Fig. 6 is a partial plan of the column and base. Figs. 7 and 8 are details of the driving devices. Fig. 9 is a section on the line 9—9 of Fig. 3.

Referring specifically to the drawings, 40 indicates a base on which the machine is mounted, and this supports a table 41 with a back board 42 against which the work, indicated at 43, is clamped by a suitable chuck 44. The table and back board are slotted as indicated at 45 to permit the passage of the cutting run of the saw 10, the return run being located beyond the edge of the table.

A column 8 is mounted on the base, behind the table, and it has upper and lower horizontal straight line guides $7^a$ extending at a right angle to the front edge of the table, the guides being spaced apart and facing each other, one being located at a sufficient height above the plane of the table, the other being located slightly below the table top. The saw carriage or frame 6 has upper and lower slides 7 fitting in guides $7^a$, and may be slid back and forth to retract or advance the saw. The saw 10 passes over the upper and lower band wheels or pulleys 9, the cutting run of the saw passing between upper and lower guide rollers 11, mounted on the frame 6, to present the saw in a plane parallel to the movement of the sliding frame, to correct the inclination due to the angularity of the axes of the band wheels with respect to said line of movement. Each of the band wheels is carried on a bearing bracket 12 which is fastened to an arm $12^a$, projecting from the frame 6, by means of a slot and bolt 13, the contacting faces being segmental so that the brackets may be set at different angular positions on the arms, thereby varying the angle of the band wheels and accordingly varying the position of the return run of the saw with respect to the cutting run. The center of curvature of the contacting faces of the bracket 12 and arm $12^a$ is the point of the cutting edge of the saw, so that said cutting edge remains in the same position at all adjustments, and the two runs of the saw may if desired, be set in the same plane by suitable adjustment of the brackets. The lower band wheel 9 is the driven wheel, and is driven by a power shaft 50 provided with tight and loose pulleys T and L, and mounted in suitable bearings on the column and carrying a spur gear 51 which drives a pinion 52 on a way shaft 18 which carries a pinion $14^a$ meshing with a bevel gear 14 on the shaft of the lower band wheel. This pinion $14^a$ is slidable lengthwise on the shaft 18 and has a feather which travels in a key way 17 on the shaft. The bevel gear 14 of course moves with the frame 6 carrying the band wheels and the pinion $14^a$ is given the same movement by means of a grooved collar 15 fixed to the pinion, and a forked arm 16 projecting from the frame 6 and engaging in the groove in the collar, whereby the pinion slides back and forth with the saw frame and rotates to drive the gear 14 and the band wheel shaft. Different angular adjustments of the brackets 12 require different bevel gears 14 on the band wheel shaft, to suit the resulting angle.

To fed the saw frame 6 there is provided a non-traveling screw 19, mounted in the saw frame 6 and driven by a belt 20 and pulleys from the way shaft 18. This screw may be engaged by a half nut 21 mounted on the column 8 in position to be slid in or out of engagement by means of a handle 22. When the screw engages the half nut, the carriage is fed forwardly. Any other suitable feed mechanism may be used, such for example as the weight 29, indicated in dotted lines, with a rope 30 connected to the carriage.

To stop the advance of the saw, I provide an adjustable stop 23 mounted on the upper slide 7 and having an arm 23ª projecting in position to strike the upper arm of a bell crank lever 24 which is fulcrumed at 24ª on the column, and the other arm of which is connected to a rod 25 the lower end of which is engageable in a notch 26 in a belt shifter 27 adapted to shift the belt on the pulleys T and L. The belt is normally shifted to the loose pulley by a spring 28 connected to the shifter. To start the machine, the shifter rod 27 is pulled forwardly to shift the belt to the tight pulley, and the rod 25 drops into the notch 26. When the carriage advances until the arm 23ª strikes the lever 24 it lifts the rod from the notch, and the spring 28 pulls the shifting rod 27 back and throws the belt to the loose pulley. This stops the drive of the saw. The feed of the frame is controlled by the handle 22 and half nut as above explained.

In use the work is clamped on the table, and by the means described the saw and its pulleys, and the frame carrying the same move forwardly to carry the cutting run of the saw into and through the work, and the proper adjustment having been made to suit the thickness of the work, the piece of work will be cut off before the return run of the saw reaches the plane or line of the work. Of course in cutting off short pieces, of less length than the distance between the runs of the saw, the angle is immaterial because the return run will pass outside the end of the work. The guide rollers 11 hold the cutting run of the saw in proper position irrespective of the angle of the band wheels. The belt 20 will preferably be made elastic to accommodate the change of position between its pulleys incident to the back and forth movement of the carriage 6. If a weight feed is used the screw feed is omitted. After the cut is completed the carriage may be pushed back by hand, or otherwise.

What I claim as new is:

1. In a band saw machine, the combination of a work table, a reciprocating frame movable in a plane across the plane of the work table, a band saw and its wheels, bearing brackets mounted on said frame and supporting the wheels at opposite sides of the plane of the table and adjustable to vary the angle of the axes of the wheels with respect to the line of movement of the frame, means to drive the saw, and means to guide the saw.

2. In a band saw machine, the combination of a frame, a band saw and its wheels, bearing brackets mounted on the frame and supporting the wheels with the axes of the wheels at an angle to the line of movement of the frame, said brackets being adjustable angularly with respect to the line of saw runs to locate one run of the saw more or less in advance of the other, means to drive the saw, and means to guide the saw.

3. In a band saw machine, the combination of a table, a support beside the table, having guides, a frame slidable back and forth in said guides transversely of the plane of the table top, band wheels carried by said frame above and below said plane, a band saw running on said wheels, the wheels being located at an angle to the line of movement of the frame, whereby one run of the saw is located in advance of the other, means to vary such relative location, means to drive the saw, and means to guide the saw.

4. In a band saw machine, the combination of a reciprocating frame, a band saw and its wheels carried by the frame, and means to drive one of said wheels, including a shaft, a pinion slidable and non rotatable thereon, a gear on the wheel shaft meshing with said pinion, and a connecting member between the frame and the pinion, to slide the latter on its shaft according to the movement of the former.

In testimony whereof, I do affix my signature in presence of two witnesses.

GEORGE C. HUNTER.

Witnesses:
JOHN A. BOMMHARDT,
J. B. DAVIS.